May 26, 1953 E. C. PICKARD 2,639,938
VEHICLE BODY PILLAR AND TRIM ASSEMBLY
Filed Jan. 24, 1951 2 Sheets-Sheet 1

E. C. PICKARD
INVENTOR.

BY
ATTORNEYS

May 26, 1953 E. C. PICKARD 2,639,938
VEHICLE BODY PILLAR AND TRIM ASSEMBLY
Filed Jan. 24, 1951 2 Sheets-Sheet 2
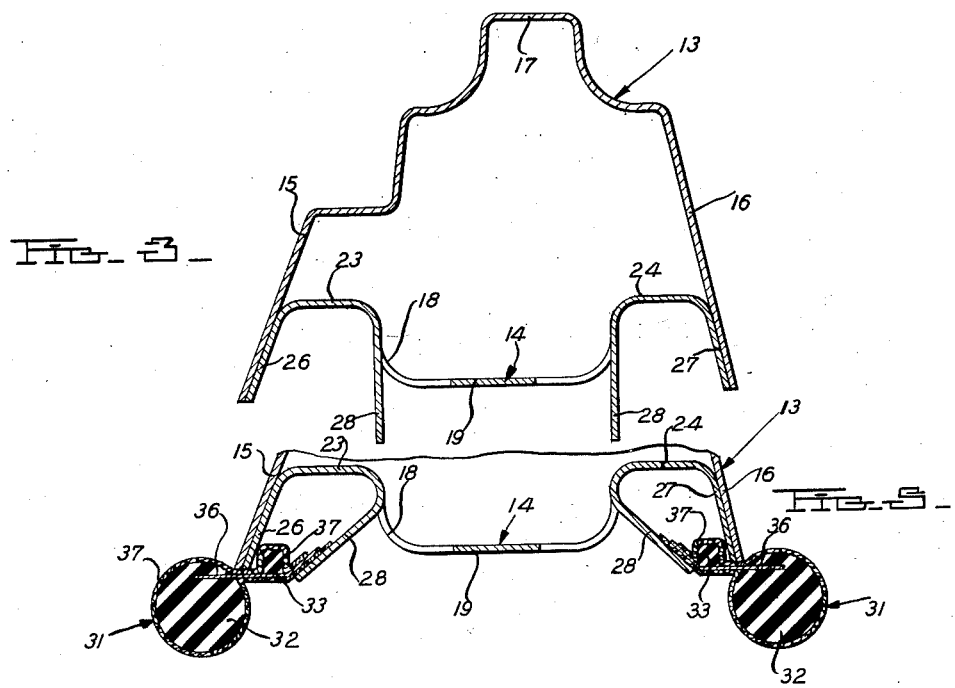
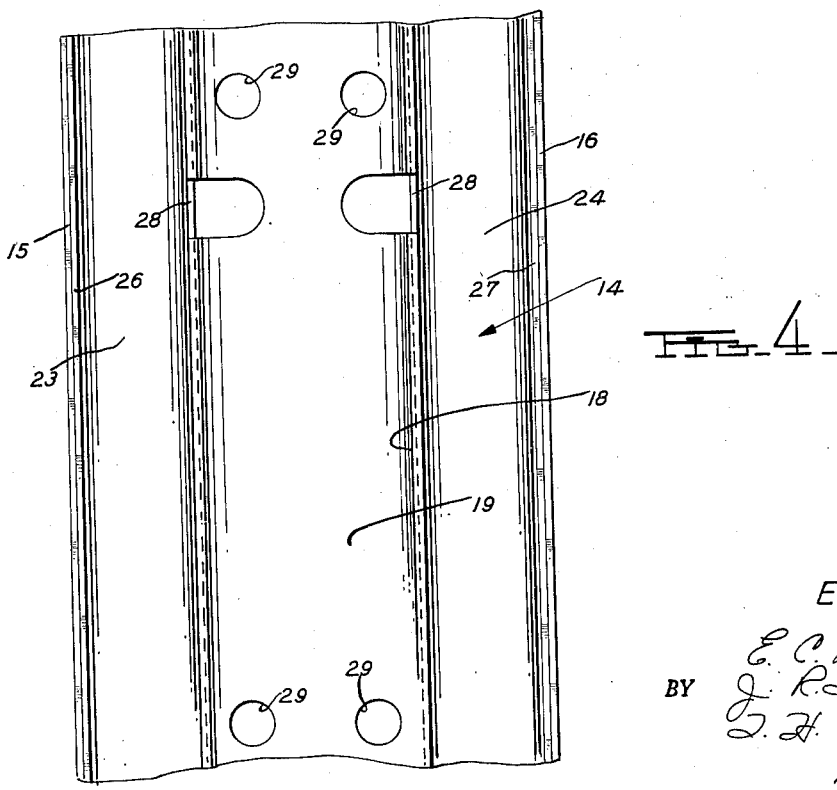
E.C. PICKARD
INVENTOR.
BY
ATTORNEYS Patented May 26, 1953

2,639,938

UNITED STATES PATENT OFFICE 2,639,938

VEHICLE BODY PILLAR AND TRIM ASSEMBLY

Edwin C. Pickard, Detroit, Mich., assignor to Ford Motor Company, Dearborn, Mich., a corporation of Delaware Application January 24, 1951, Serial No. 207,512

1 Claim. (Cl. 296—28)

This invention relates generally to a vehicle body construction, and particularly to a pillar, windcord and trim panel assemby.

An object of the present invention is to provide a vehicle body construction in which a windcord on weather strip can be positively held in place adjacent a door opening in such manner as to facilitate the assembly of the structure and to provide an economical manufacture. This is accomplished by utilizing a windcord having an enlarged cylindrical sealing portion formed of resilient material and a smaller beaded portion spaced from the sealing portion and connected thereto by suitable webbing, and by providing a door pillar or body frame construction having an inwardly extending flange against which the beaded portion of the windcord is clamped. In the case of a door pillar, the pillar is constructed of an outer section and an inner section, each having juxtaposed inwardly extending flanges for engaging the windcord and with the inner section having spaced tabs struck out therefrom and bent into engagement with the beaded portion of the windcord to temporarily hold it in place during assembly. Subsequently, a trim panel is applied to the pillar by suitable fastening means and permanently clamps the windcord in place. This arrangement simplifies the construction since the provision of a tacking strip to which the windcord can be fastened is unnecessary, the tabs serving to hold the windcord while the trim panel is being applied thereto.

Another object of the invention is the improved securing of a trim panel to an appreciably channeled pillar face by means of resilient trim clips to maintain the trim panel under pressure to clamp the trim panel against windcords located between the edges of the trim panel and the adjacent edges of the channeled pillar face.

Other objects and advantages of the invention will be made more apparent as this description proceeds, particularly when considered in connection with the accompanying drawings, wherein:

Figure 3 is a cross sectional view of the door pillar shown in Figure 2 prior to the assembly of the windcord and trim panel thereto.

Figure 4 is an inside elevational view of a portion of the door pillar shown in Figure 3.

Figure 5 is a cross sectional view similar to a portion of Figure 3 but showing the windcord assembled to the door pillar.

Figure 1:
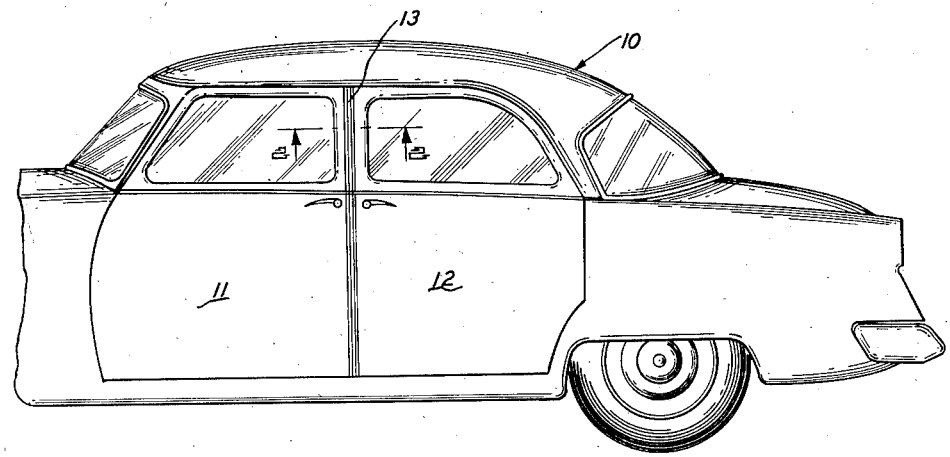
Figure 1 is a side elevational view of a portion of a passenger car embodying the present invention.

Referring now to Figure 1 of the drawings, the reference character 10 indicates a motor vehicle of the fordor type having front and rear doors 11 and 12 separated by a stationary door pillar.

With reference now to Figure 3, the door pillar is formed of a channel shaped outer pillar section 13 and an inner pillar section 14. The outer pillar section 13 is a sheet metal stamping generally of channel shape opening inwardly, and comprises sides 15 and 16 connected by a base 17. The open side of the outer pillar section is closed by the inner pillar section 14 to form a boxlike pillar. The inner pillar section 14 has a central channel shaped portion 18 opening outwardly of the vehicle with the base 19 thereof appreciably offset outwardly from the inner marginal edges of the sides 15 and 16 of the outer pillar section and is provided at opposite sides of the central channel shaped portion 18 with inwardly opening channel shaped portions 23 and 24. The channels 23 and 24 terminate in side flanges 26 and 27 lying adjacent the sides 15 and 16 of the outer pillar section and suitably secured thereto as by welding. Tabs 28 are struck out from intermediate portions of the inner pillar section 14 and when initially formed extend laterally inwardly as shown in Figure 3. These tabs are arranged in pairs as seen in Figure 4 and a plurality of such pairs are provided in vertically spaced relationship on the inner pillar section. The inner section 14 is also formed with a plurality of holes 29 formed in the base 19 of the central channel shaped portion 18 and also arranged in vertically spaced pairs.

Referring now to Figure 5 it will be seen that a windcord 31 isp rovided adjacent each inner corner of the door pillar for cooperation with the front and rear doors 11 and 12 to provide seals therefor in the conventional manner. Each windcord 31 comprises a cylindrical sealing portion 32 formed of a resilient material such as sponge rubber and a smaller beaded portion 33 formed of a less resilient material such as hard rubber or suitable cording. The beaded portion 33 is spaced from the cylindrical portion 32 and is suitably connected thereto by the means hereinafter described.

An inner reinforcing strip 36 formed of relatively stiff cording reinforced with wire has one end embedded in the cylindrical sealing portion 32 of the windcord and the other end in engagement with one edge of the beaded portion 33. The reinforcing strip 36 extends a short distance beyond the beaded portion. A fabric cover 37 surrounds the cylindrical sealing portion 32, the beaded portion 33 and the reinforcing strip 36, being suitably cemented or otherwise secured thereto.

During assembly of the windcords to the door pillar each windcord is positioned adjacent the marginal edges of the side flanges 15 and 26 of the outer pillar member 13 and the inner pillar member 14 with the beaded portion 33 positioned on one side of the adjacent flanges and with the cylindrical sealing portion 32 on the opposite side thereof. The tabs 28 are then bent over to the position shown in Figure 5 in which the outer ends of the tabs are in engagement with the windcords and serve to temporarily hold the latter in place upon the pillar. It will be seen that the tabs clamp the beaded portion 33 of each windcord against the adjacent flange 26 of the inner section 14 of the pillar. The tabs 28 are so spaced vertically along the pillar as to provide adequate temporary support for the windcords.

Figure 2:
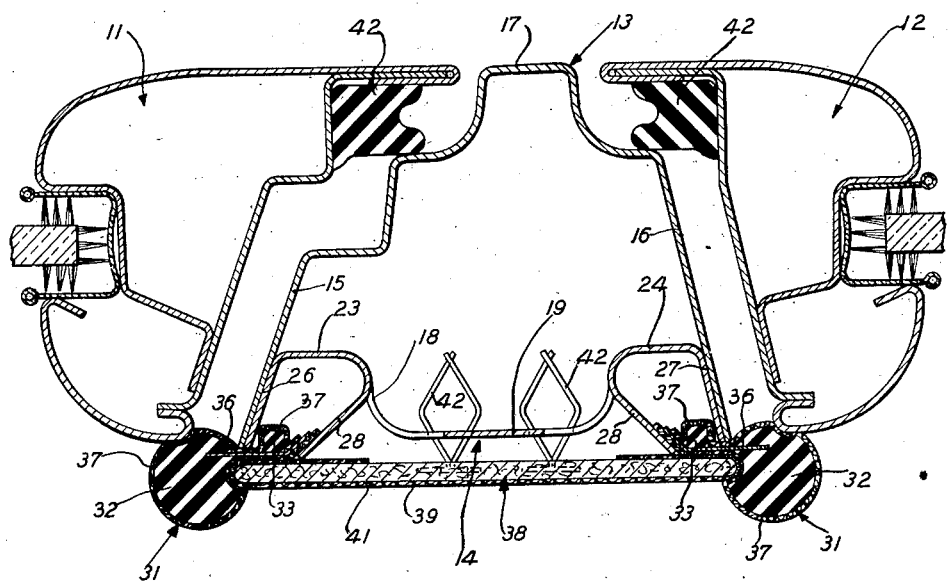
Figure 2 is an enlarged cross sectional view taken on the line 2—2 of Figure 1.

With reference now to Figure 2, the next step in the assembly is the mounting of the interior trim panel 38 in place against the inner side of the pillar. The trim panel 38 comprises a cardboard base 39 covered with a suitable upholstery material 41 in combination with the conventional resilient wire trim clips 42 secured to the cardboard 39. To assemble the trim panel 38 to the pillar it is positioned against the inner side of the pillar with the trim clips 42 in alignment with the holes 29 formed in the inner pillar section 14. Manual pressure upon the trim panel then snaps the trim clips through the holes 29 to mount the panel on the pillar. The webbing interconnecting the sealing portion 32 and the beaded portions 33 of each windcord is thus clamped between the marginal edge of the trim panel 38 and the marginal edges of the adjacent side flanges of the door pillar, thus preventing lateral displacement of the windcords. Longitudinal displacement of the windcords is prevented by the beaded portions 33 which are positioned adjacent the side flanges of the inner pillar section.

As seen in Figure 2, the windcords 31 function in the usual manner, being engaged by the adjacent portions of the doors 12 and 13 to provide seals at the inner side of the doors, suitable weather strips 42 being provided to seal the doors adjacent their outer edges.

It will be understood that other types of fastening means may be utilized if desired to secure the trim panel to the door pillar. In addition, while the drawings show the mounting arrangement for the windcords adjacent the door pillar of a fordor type of vehicle body, the same mounting arrangement can be utilized for the windcord positioned adjacent the top of each door and along the hinged edge thereof, and also for the windcords adjacent the marginal edges of the doors of a tudor type of vehicle body.

It will be understood that the invention is not to be limited to the exact construction shown and described, but that various changes and modifications may be made without departing from the spirit and scope of the invention, as defined in the appended claim.

What is claimed is:

In a vehicle body construction, a pillar having an outer section comprising a base portion and integrally formed side flanges extending laterally inwardly from opposite sides of said base portion, an inner pillar section having an intermediate longitudinally extending portion appreciably offset outwardly from the longitudinal plane containing the marginal edges of said side flanges, and laterally inwardly extending side flanges with the side flanges of said inner and outer sections arranged in juxtaposition and secured together, the marginal edges of the side flanges of said inner and outer sections terminating adjacent each other and presenting an inwardly facing edge portion having a longitudinal dimension equal to the thickness of said two flanges, a pair of windcords each having a generally cylindrical compressible sealing portion and a smaller beaded portion spaced from said sealing portion and connected thereto by flexible webbing, each of said windcords being assembled to one of the inwardly facing edge portions of said pillar with the flexible webbing overlying said edge portion and extending generally at right angles to the side flanges of the inner and outer pillar sections, the beaded portion of each of said windcords being positioned adjacent the side flange of the inner pillar section, a plurality of vertically spaced tabs struck out from the intermediate portion of said inner pillar section and bent into engagement with said windcords to retain the latter in place along the edges of said pillar during assembly, a relatively rigid trim panel adjacent the offset intermediate portion of said inner pillar section with the opposite edges thereof overlying the juxtaposed side flanges of the pillar sections and the adjacent portions of said windcords and with the intermediate portion of said trim panel spaced from the offset intermediate portion of said inner pillar section, and a plurality of resilient fasteners securing said trim panel to the offset intermediate portion of said inner pillar section to resiliently clamp the trim panel and the windcords to the pillar.

EDWIN C. PICKARD.

References Cited in the file of this patent

UNITED STATES PATENTS

| Number | Name | Date |
| --- | --- | --- |
| 1,896,632 | Ledwinka | Feb. 7, 1933 |
| 2,051,757 | Travis | Aug. 18, 1936 |
| 2,474,985 | Rivard et al. | July 5, 1949 |